United States Patent
Honda

(10) Patent No.: US 8,422,055 B2
(45) Date of Patent: Apr. 16, 2013

(54) COMPUTER READABLE MEDIUM, IMAGE PROCESSING APPARATUS, IMAGE PROCESSING SYSTEM AND IMAGE PROCESSING METHOD

(75) Inventor: Kensaku Honda, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 704 days.

(21) Appl. No.: 12/398,273

(22) Filed: Mar. 5, 2009

(65) Prior Publication Data

US 2010/0053698 A1 Mar. 4, 2010

(30) Foreign Application Priority Data

Aug. 26, 2008 (JP) ................. 2008-216535

(51) Int. Cl.
*G06F 3/12* (2006.01)
*H04N 1/40* (2006.01)

(52) U.S. Cl.
USPC .......................................... 358/1.15; 358/471

(58) Field of Classification Search .................. 358/474; 707/104.1, 203
See application file for complete search history.

(56) References Cited

U.S. PATENT DOCUMENTS

| | | | |
|---|---|---|---|
| 6,868,424 B2 | 3/2005 | Jones et al. | |
| 2004/0019613 A1* | 1/2004 | Jones et al. | 707/200 |
| 2007/0106902 A1* | 5/2007 | Miyata | 713/176 |
| 2007/0174896 A1* | 7/2007 | Furuya et al. | 726/1 |

FOREIGN PATENT DOCUMENTS

| | | |
|---|---|---|
| JP | 6-225053 A | 8/1994 |
| JP | 08-044853 A | 2/1996 |
| JP | 2004-86893 A | 3/2004 |
| JP | 2006-313489 A | 11/2006 |
| JP | 2006-313969 A | 11/2006 |
| JP | 2006-323687 A | 11/2006 |

OTHER PUBLICATIONS

Japanese Office Action issued in Application No. 2008-216535, dated Jul. 13, 2010.

\* cited by examiner

*Primary Examiner* — Marivelisse Santiago Cordero
*Assistant Examiner* — Mesfin Getaneh
(74) *Attorney, Agent, or Firm* — Sughrue Mion, PLLC

(57) ABSTRACT

A computer readable medium storing a program causing a computer to execute a process for managing image information, the process includes: accepting image information and registration destination information that indicates a registration destination of the image information; acquiring a registration condition determined based on feature information of the image information that is allowed to be registered in the registration destination indicated by the accepted registration destination information; extracting the feature information from the accepted image information; and registering the accepted image information in the registration destination when the extracted feature information satisfies the acquired registration condition.

9 Claims, 12 Drawing Sheets

FIG.3

| ID | REGISTRATION DESTINATION INFORMATION | REGISTRATION CONDITION | COVER SHEET | CONTENT |
|---|---|---|---|---|
| 001 | FOLDER X / DOCUMENT 1.pdf | BLANK SHEET IS NOT CONTAINED, "CONFIDENTIAL" IMAGE IS CONTAINED | SHEET-001.pdf | FOLDER X / DOCUMENT 1.pdf |
| 002 | FOLDER Y | NUMBER OF PAGES IS 10 | SHEET-002.pdf | FOLDER Y / DOCUMENT 2.pdf |
| 003 | FOLDER Z / DOCUMENT A | BLANK SHEET IS NOT CONTAINED, "CONFIDENTIAL" CHARACTER STRING IS CONTAINED | SHEET-003.pdf | UNREGISTERED |
| ... | ... | ... | ... | ... |

214A

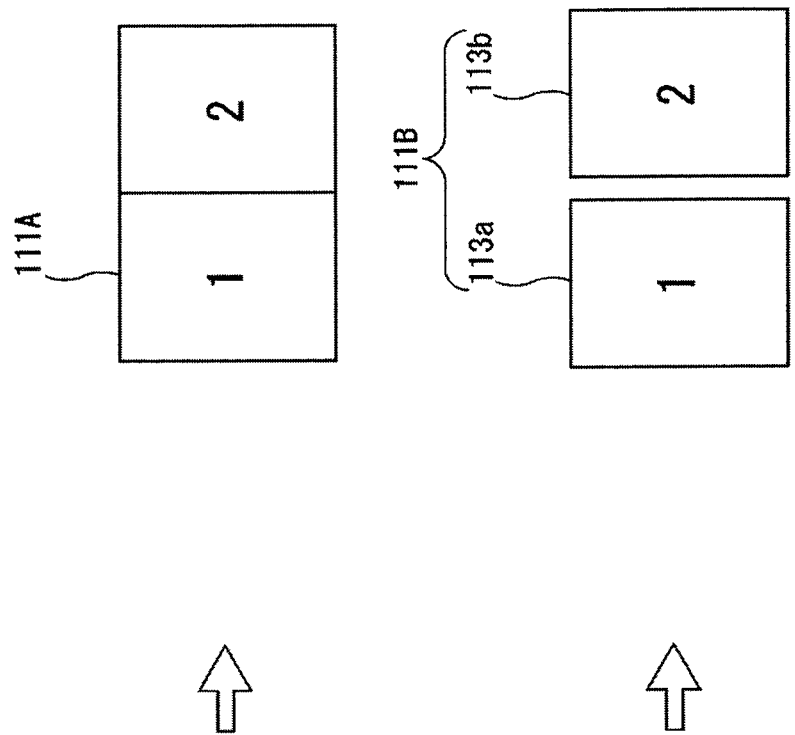
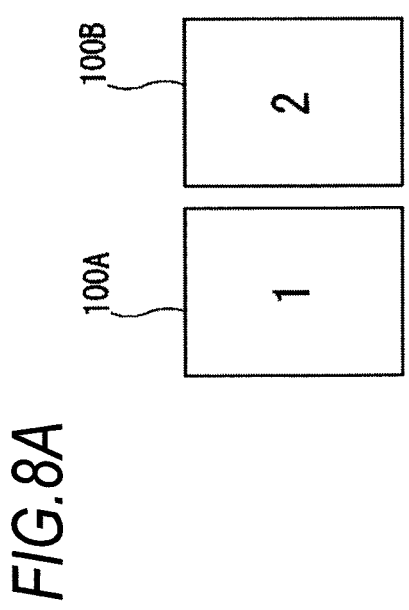
FIG.8A
FIG.8B

FIG.10

| ID | REGISTRATION DESTINATION INFORMATION | VERSION ADDITION CONDITION | COVER SHEET | CONTENT |
|---|---|---|---|---|
| 001 | FOLDER X / DOCUMENT 1.pdf | IMAGE SIMILARITY DEGREE IS 80% OR MORE, CHARACTER STRING SIMILARITY DEGREE IS 70% OR MORE | SHEET-001.pdf | FOLDER X/DOCUMENT 1.pdf |
| 002 | FOLDER Y | CHARACTER STRING SIMILARITY DEGREE IS 80% OR MORE, NUMBER OF PAGES IS 10 | SHEET-002.pdf | FOLDER Y/DOCUMENT 2.pdf |
| 003 | FOLDER Z / DOCUMENT A | IMAGE SIMILARITY DEGREE IS 75% OR MORE, BLANK SHEET IS NOT CONTAINED | SHEET-003.pdf | UNREGISTERED |
| ... | ... | ... | ... | ... |

COMPUTER READABLE MEDIUM, IMAGE PROCESSING APPARATUS, IMAGE PROCESSING SYSTEM AND IMAGE PROCESSING METHOD

CROSS-REFERENCE TO RELATED APPLICATIONS

This application is based on and claims priority under 35 USC 119 from Japanese Patent Application No. 2008-216535 filed Aug. 26, 2008.

BACKGROUND

1. Technical Field

This invention relates to a computer readable medium, an image processing apparatus, an image processing system and an image processing method.

SUMMARY

According to an aspect of the invention, a computer readable medium stores a program causing a computer to execute a process for managing image information. The process includes: accepting image information and registration destination information that indicates a registration destination of the image information; acquiring a registration condition determined based on feature information of the image information that is allowed to be registered in the registration destination indicated by the accepted registration destination information; extracting the feature information from the accepted image information; and registering the accepted image information in the registration destination when the extracted feature information satisfies the acquired registration condition.

BRIEF DESCRIPTION OF THE DRAWINGS

Exemplary embodiment(s) of the present invention will be described in detail based on the following figures, wherein:

FIG. 3 is a drawing to show an example of metadata;

FIG. 8A is a drawing to show an example of the case where a read condition is given so as to provide a smaller number of pieces of image information than the number of paper documents;

FIG. 8B is a drawing to show an example of the case where a read condition is given so as to provide a larger number of pieces of image information than the number of paper documents;

FIG. 10 is a drawing to show an example of metadata;

DETAILED DESCRIPTION

[First Exemplary Embodiment]

Figure 1:
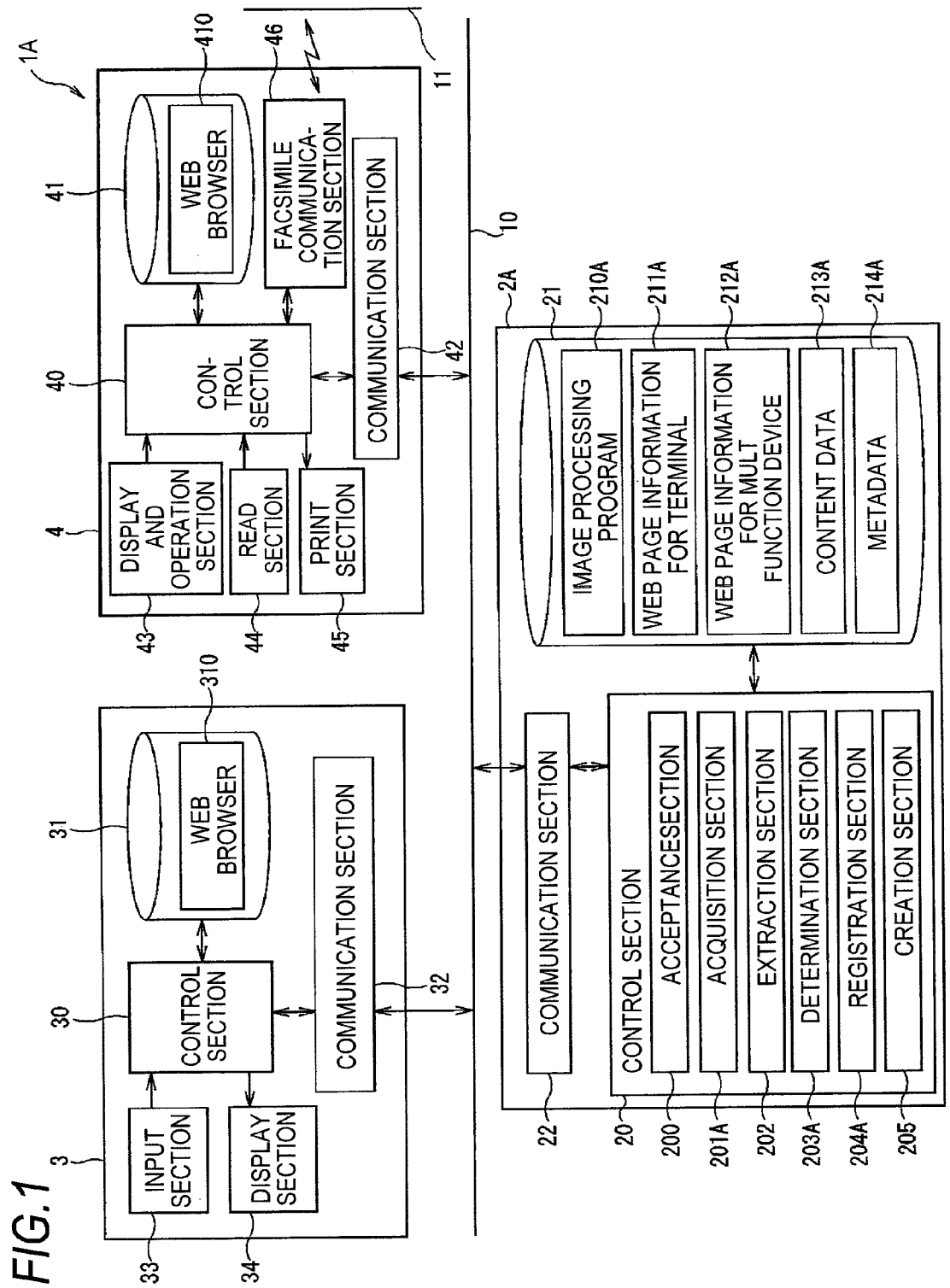
FIG. 1 is a block diagram to show a schematic configuration example of an image processing system according to a first exemplary embodiment of the invention.

FIG. 1 is a block diagram to show a schematic configuration example of an image processing system according to a first exemplary embodiment of the invention. An image processing system 1A includes a terminal 3, an image processing server (image processing apparatus) 2A and a network 10. The terminal 3 enters a registration condition for each registration destination, a multi function device 4 for reading image information from a paper document and transmitting registration destination information indicating the registration destination of the image information. The image processing server 2A manages the registration condition entered through the terminal 3 for each registration destination and accepts the image information and the registration destination information from the multi function device 4. And the image processing server 2A registers the image information in the registration destination when the image information satisfies the registration condition corresponding to the registration destination indicated by the registration destination information. The network 10 connects the system components.

The expression "registration destination" indicates the position of the registration location for registering the image information, provided in a storage section of the image processing server 2A. The registration destination information indicates information in which the registration destination is recorded. In the exemplary embodiment, a folder and a prospective file object are used as the registration destination. The registration destination may be represented by an absolute path or may be represented by a relative path.

As the "prospective file object," a file which does not have an entity and exists in a recognizable state of the presence is placed in the registration destination of image information expected to be registered in the future. Corresponding image information is registered in the prospective file object, whereby the prospective file object has the image information as an entity and can be handled like usual image information.

The "registration condition" is a condition determined by feature information of image information that can be registered in the registration destination. The feature information of image information contains specific character string information contained the image information, specific image information, for example, formed of a group of pixels, and the like. A specific example of the registration condition is described later.

As the image information, the substance of a paper document of a document, a photo, a diagram, an illustration, etc., is stored as digital data; it is not limited to the substance mentioned above if the substance to be registered is stored.

The network 10 is a communication network such as a LAN (local area network) for transmitting and receiving data by conducting wired communications (electric cable, optical cable, etc.,), wireless communications (radio wave, infrared radiation, etc.,), or the like. The network 10 may be a network connected to the Internet.

(Terminal)

The terminal 3 includes a control section 30 implemented as a CPU, etc., for example, for controlling the sections of the terminal 3, a storage section 31 implemented as ROM, RAM, a hard disk, etc., for example, for storing programs of a web browser 310, etc., data, etc., a communication section 32 implemented as a network interface card, etc., for example, connected to the network 10, an input section 33 implemented as a keyboard, a mouse, etc., for example, for accepting operation of data entry of a registration condition, etc., and a display section 34 implemented as a liquid crystal display, etc., for example, for displaying various screens of the web browser 310, etc.

The terminal 3 can be implemented as a computer, a portable information terminal (PDA), a mobile telephone, etc., for example. In FIG. 1, the number of terminals 3 is one, but may be two or more.

(Multi Function Device)

The multi function device 4 includes a control section 40 implemented as a CPU, etc., for example, for controlling the sections of the multi function device 4, a storage section 41 implemented as ROM, RAM, a hard disk, etc., for example, for storing programs of a web browser 410, etc., data, etc., a communication section 42 implemented as a network interface card, etc., for example, connected to the network 10, a display and operation section 43 including a touch panel display with a touch panel superposed on the surface of a display and hard keys of a start key, etc., a read section 44 for optically reading digital image information from a paper document, a print section 45 for printing image information on a record medium of paper, etc., and a facsimile communication section 46 connected to a telephone line network.

The read section 44 includes a document bed on which a document is placed one sheet at a time, an ADF (automatic document feeder) for automatically feeding a document one sheet at a time to the document bed, a photoelectric transducer for optically reading image information from the document placed on the document bed or the document fed from the ADF, and an A/D converter for converting an analog signal output from the photoelectric transducer into a digital signal.

The print section 45 can use any of various print systems of electrophotography, ink jet, thermosensitive transfer, for example, and prints a cover sheet, etc., as an indication sheet for indicating the registration destination of a paper document based on cover sheet information sent from the image processing server 2A.

The control section 40 performs character recognition processing, for example, for a cover sheet read through the read section 44 and recognizes registration destination information from the characters, etc., printed on the cover sheet. In the character recognition processing, a character pattern in a predetermined area is cut from attribute indication sheet data, a comparison is made between the character pattern and a character recognition dictionary according to a pattern matching method, for example, and the character pattern with the highest similarity is adopted as the recognition result.

In FIG. 1, the number of multi function devices 4 is one, but may be two or more. Such an apparatus may be implemented by placing apparatus each having a single function, such as a scanner and a facsimile machine, as a system.

(Image Processing Server)

The image processing server 2A includes a control section 20 implemented as a CPU, etc., for example, for controlling the sections of the image processing server 2A, a storage section 21 implemented as ROM, RAM, a hard disk, etc., for example, for storing various programs and data, and a communication section 22 implemented as a network interface card, etc., for example, connected to the network 10 for transmitting and receiving data.

The image processing server 2A can be implemented as a computer, a workstation (WS), etc., for example.

The storage section 21 stores an image processing program 210A, web page information for terminal 211A, web page information for multi function device 212A, content data 213A, metadata 214A, and the like.

The web page information for terminal 211A is screen information described in a markup language of MTML (Hyper Text Markup Language), XML (Extensible Markup Language), etc., for example, for displaying various screens on the terminal 3 in response to the URL specified by the web browser 310 of the terminal 3.

Like the web page information for terminal 211A, the web page information for multi function device 212A is screen information described in a markup language for displaying various screens on the multi function device 4 in response to the URL specified by the web browser 410 of the multi function device 4.

Figure 2:
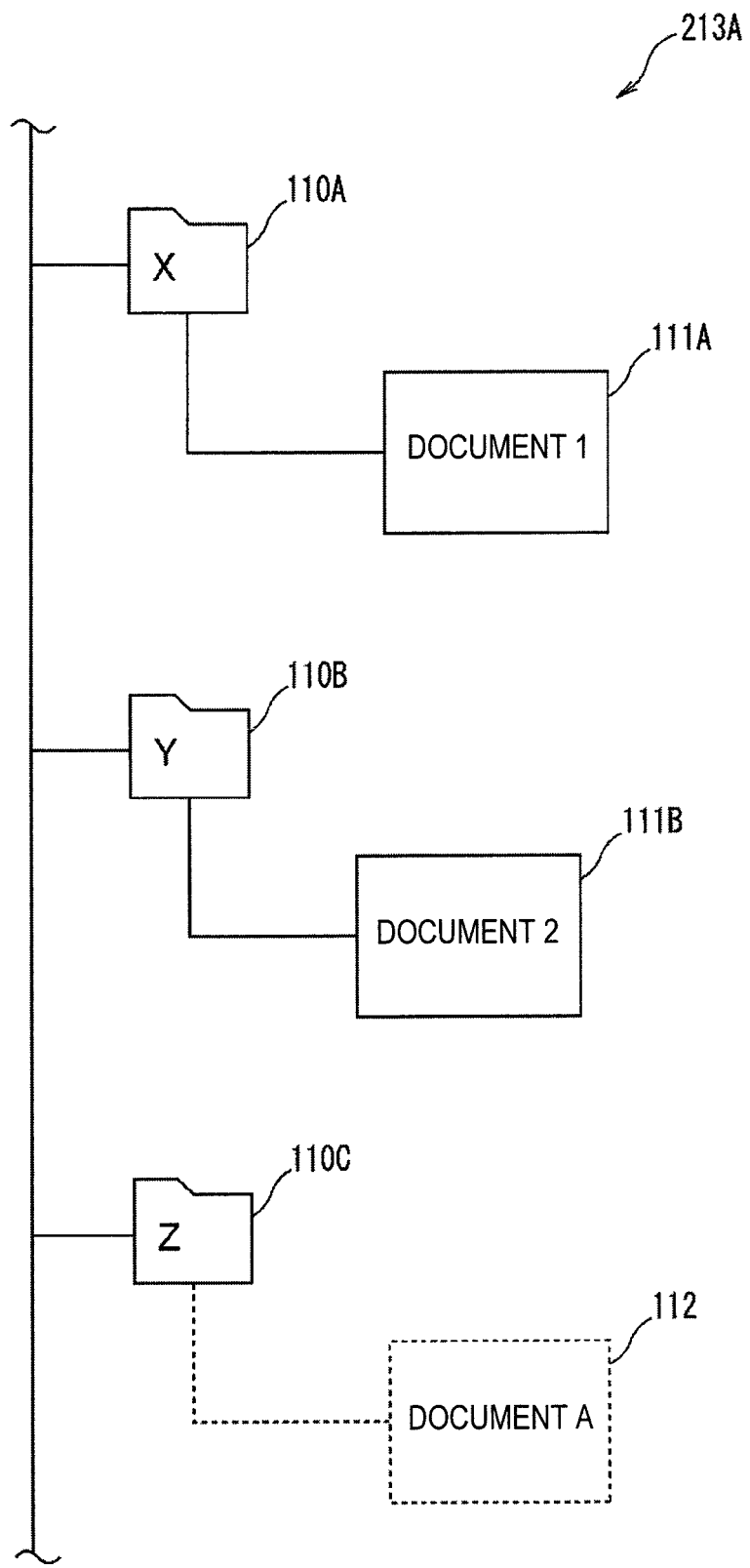
FIG. 2 is a drawing to show an example of content data.

FIG. 2 is a drawing to show an example of the content data 213A. The content data 213A is a storage section for storing image information to be registered and a plurality of folders 110A to 110C for sorting out and storing a plurality of pieces of image information are provided hierarchically. The folders 110A to 110C may be sorted for each type or use of documents or may be sorted for each department or group of the company or for each customer company, for example.

Image information 111A and image information 111B with image information titles "document 1" and "document 2" are stored in the folders "X" 110A and "Y" 110B respectively. A prospective file object 112 is placed in the folder "Z" 110C.

FIG. 3 is a drawing to show an example of the metadata 214A. For each prospective file object or folder as the registration destination, the metadata 214A stores a registration condition, etc., associated with the prospective file object or the folder.

Each record of the metadata 214A is provided with the following fields: ID for identifying the record; registration destination information indicating the registration destination; registration condition associated with the registration destination; cover sheet indicating the linked location where image information of the cover sheet is stored; and content indicating the linked location where image information is stored when the image information is registered in the content data 213A.

In the content data 213A illustrated in FIG. 3, the registration destination information of the records on the first and third rows indicates a prospective file object and the registration destination information of the record on the second row indicates a folder. The image information satisfying the registration conditions in the records on the first and second rows is registered as the linked location recorded in the content field, namely, the content data 213A, but the image information satisfying the registration conditions in the records on the third row is unregistered.

The registration conditions can be conditions such that whether or not a blank sheet is contained, that whether or not specific character string information or image information is contained, and that whether or not the number of pages of the image information to be registered is a specific number of pages, for example. The registration conditions are not limited to the above-mentioned examples if the registration conditions relate to feature information of image information. A plurality of conditions may be combined. A different registration condition may be associated with each registration destination or the same registration condition may be associated with a plurality of registration destinations.

The control section 20 functions as an acceptance section 200, an acquisition section 201A, an extraction section 202, a determination section 203A, a registration section 204A, a creation section 205, and the like. And the control section 20 operates in accordance with the image processing program 210A stored in the storage section 21. The acceptance section 200 accepts image information and registration destination information indicating the registration destination of the image information. The acquisition section 201A acquires the registration condition corresponding to the registration destination indicated by the registration destination information accepted by the acceptance section 200. The extraction section 202 extracts feature information from the image information accepted by the acceptance section 200. The determination section 203A determines whether or not the feature information extracted by the extraction section 202 satisfies the registration condition acquired by the acquisition section 201A. The registration section 204A registers the image information in the registration destination when the determination section 203A determines that the feature information satisfies the registration condition. The creation section 205 creates cover sheet information for outputting a cover sheet.

(Operation of First Exemplary Embodiment)

Next, an example of the operation of the image processing system 1A according to the first exemplary embodiment of the invention will be discussed with reference to FIGS. 4A to 7.

(1) Setting of Registration Condition

To begin with, the user starts the web browser 310 using the terminal 3 and specifies a URL, thereby entering a command to display an object creation screen for creating a prospective file object in the folder "Z" through the input section 33 of the terminal 3.

Next, the web browser 310 of the terminal 3 accepts the command and transmits the specified URL to the image processing server 2A through the communication section 32 via the network 10.

Next, the control section 20 of the image processing server 2A transmits the web page information for terminal 211A corresponding to the specified URL to the terminal 3.

The web browser 310 displays an object creation screen based on the transmitted web page information for terminal 211A.

Figure 4A:
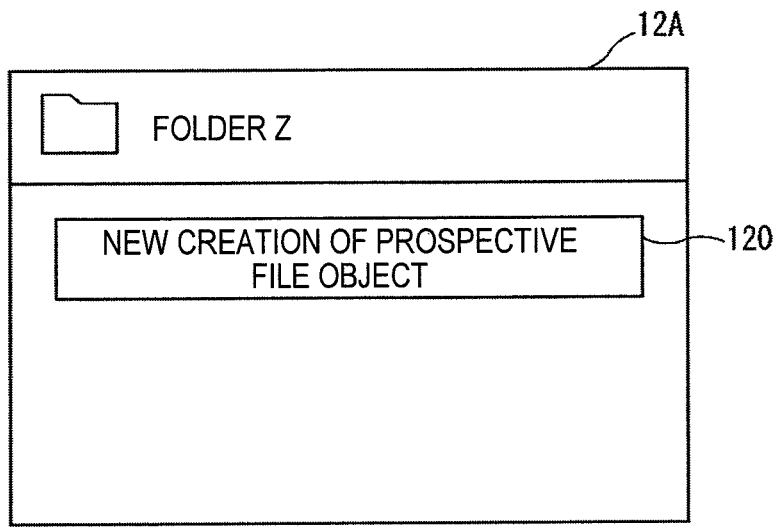
FIG. 4A is a drawing to show an example of an object creation screen.

FIG. 4A is a drawing to show an example of an object creation screen. A new creation button 120 for newly creating a prospective file object in the folder "Z" is displayed on an object creation screen 12A.

Figure 4B:
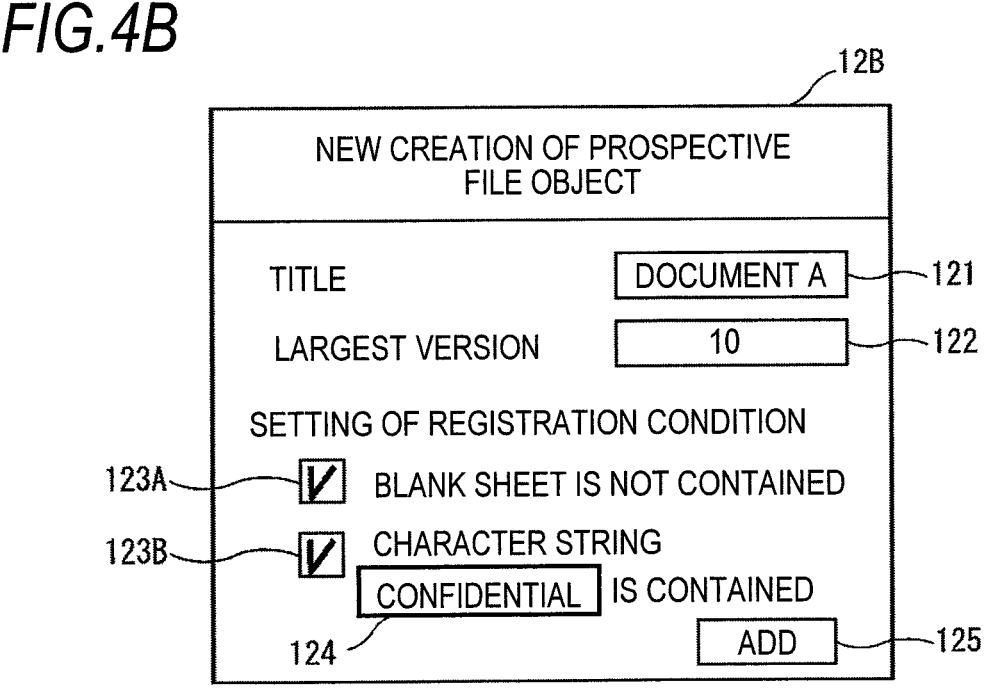
FIG. 4B is a drawing to show an example of an object creation screen.

When the user presses the new creation button 120, the web browser 310 switches the display section 34 to an object creation screen 12B illustrated in FIG. 4B.

Displayed on the object creation screen 12B in order from the top to the bottom are a title input box 121 for entering the title of the prospective file object, a version input box 122 for entering the largest version of the prospective file object, check boxes 123A and 123B for entering validity or invalidity of various registration conditions, a character string input box 124 for entering detailed setting of each registration condition, and an add button 125 for entering a command to add the prospective file object according to the entered descriptions.

Next, when the user enters the registration condition, etc., into the object creation screen 12B and presses the add button 125, the web browser 310 transmits the entered descriptions to the image processing server 2A.

Next, the control section 20 of the image processing server 2A receives the entered descriptions and adds a new record in which the registration destination information, the registration condition, etc., are recorded, to the metadata 214A based on the entered descriptions. The creation section 205 creates cover sheet information based on the entered descriptions and stores the created cover sheet information in the storage section 21 and also stores the liked location with the cover sheet information in the cover sheet field of the metadata 214A. The new record thus added corresponds to the third row of the metadata 214A illustrated in FIG. 3. The control section 20 notifies the terminal 3 that a new record has been added.

Figure 4C:
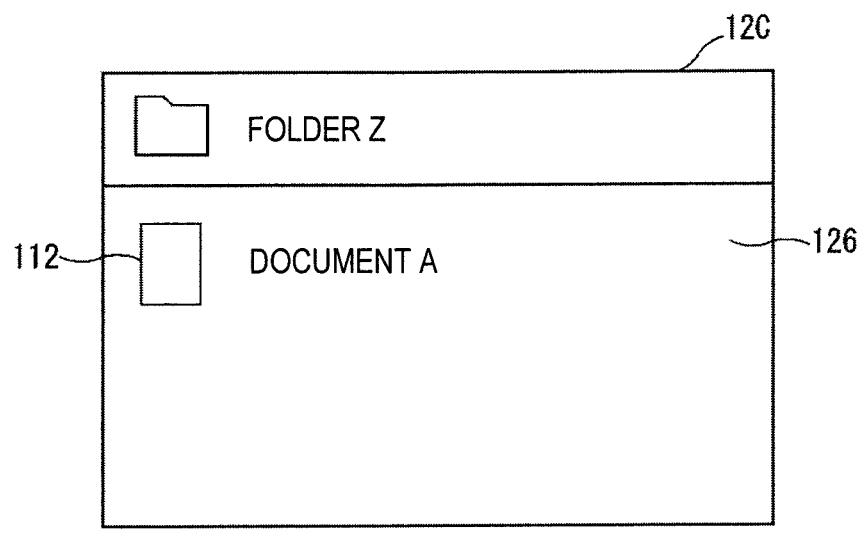
FIG. 4C is a drawing to show an example of an object creation screen.

Next, upon reception of the notification, the web browser 310 switches the display section 34 to an object creation screen 12C illustrated in FIG. 4C. This object creation screen 12C indicates in a display area 126 that the prospective file object 112 with the title "document A" has been registered in the folder "Z" as a new record.

Figure 4D:
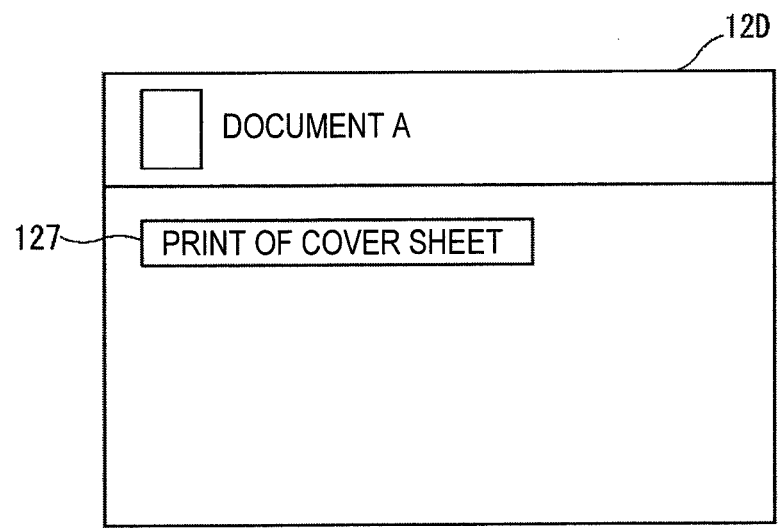
FIG. 4D is a drawing to show an example of an object creation screen.

Next, when the user performs selection operation of double click, etc., on the prospective file object 112 of "document A, " for example, in the object creation screen 12C, the web browser 310 switches the display section 34 to an object creation screen 12D illustrated in FIG. 4D. This object creation screen 12D displays a print button 127 for printing a cover sheet used in reading a paper document corresponding to the prospective file object 112 of "document A" through the multi function device 4.

Next, when the user presses the print button 127, the web browser 310 notifies the image processing server 2A that the print button 127 is pressed. Upon reception of the notification, the control section 20 of the image processing server 2A reads the cover sheet information from the storage section 21 based on the content field stored in the metadata 214A, and transmits the cover sheet information to the multi function device 4.

The multi function device 4 prints a cover sheet on the print section 45 based on the transmitted cover sheet information.

Figure 5:
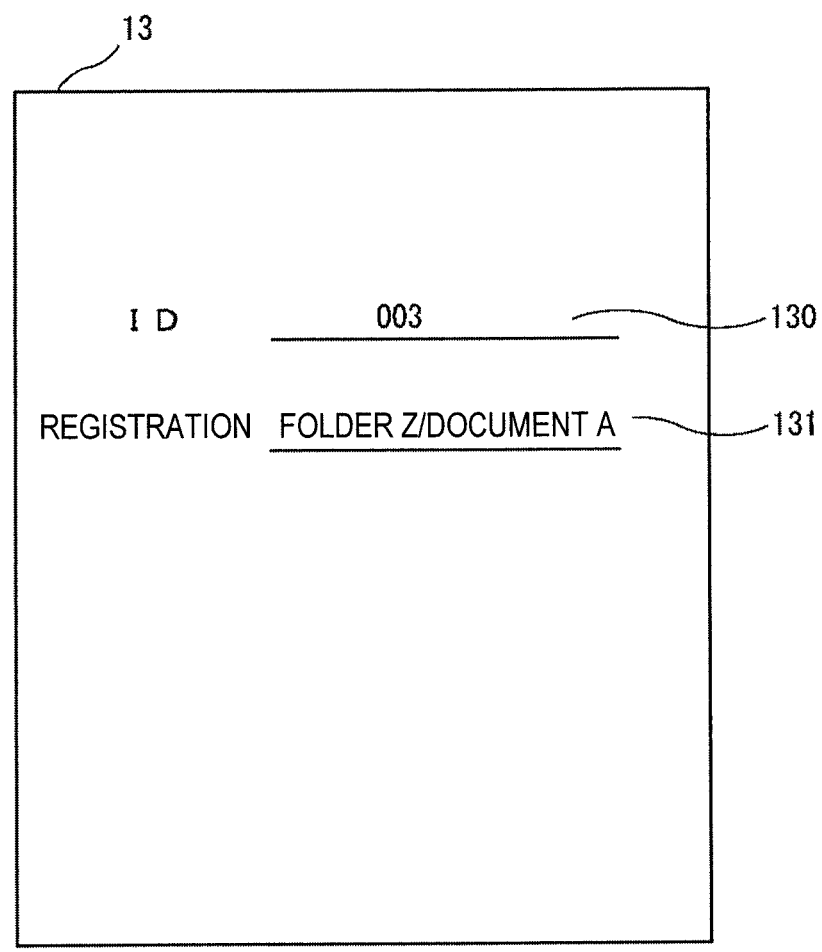
FIG. 5 is a drawing to show an example of a cover sheet.

FIG. 5 is a drawing to show an example of a cover sheet. ID 130 and registration destination 131, for example, of information stored in the metadata 214A is printed on a cover sheet 13 as information in registering the prospective file object. The registration condition may be printed on the cover sheet 13. A two-dimensional code such as QR code (registered trademark) or glyph code (registered trademark) or a one-dimensional code such as bar code may be printed on the cover sheet 13 or an IC tag may be embedded in the cover sheet 13 and necessary information may be recorded in the IC tag.

The registration condition associated with each registration destination is thus stored in the metadata 213A. The registration condition, etc., once stored in the metadata 213A may be changed, deleted, etc., as required.

(2) Read of Paper Document

When the user gives an operation start command to the multi function device 4, the web browser 410 of the multi function device 4 displays an authentication screen on the display and operation section 43. The user giving the operation start command may be the same person as or a different person from the user entering the registration condition.

Figure 6A:
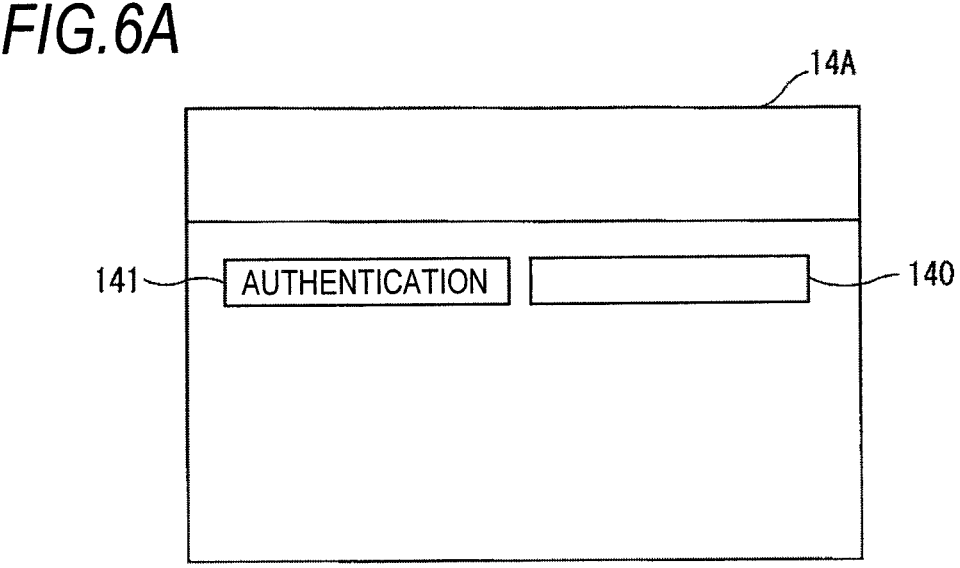
FIG. 6A is a drawing to show an example of an authentication screen.

FIG. 6A is a drawing to show an example of an authentication screen 14A. This authentication screen 14A displays a password input box 140 for entering a password for making an authentication determination as to whether or not to grant authentication and an authentication button 141 for entering an authentication start command.

When the user enters a password into the password input box 140 and presses the authentication button 141, the web browser 410 transmits the entered password to the image processing server 2A.

Upon reception of the password from the multi function device 4, the control section 20 of the image processing server 2A makes an authentication determination based on the password and transmits the web page information for multi function device 212A together with the authentication result to the multi function device 4.

Figure 6B:
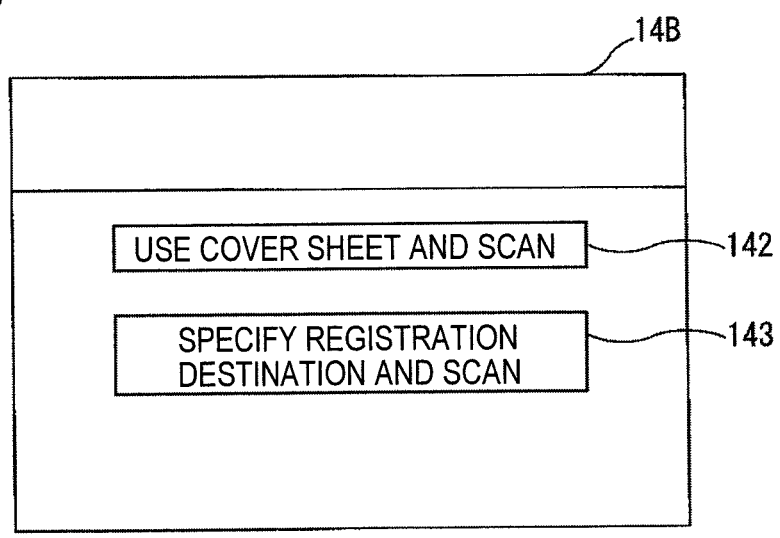
FIG. 6B is a drawing to show an example of a scan command screen.

The web browser 410 receives the authentication result and the web page information for multi function device 212A and if authentication is granted, the web browser 410 switches the display and operation section 43 to a scan command screen 14B illustrated in FIG. 6B based on the web page information for multi function device 212A.

This scan command screen 14B displays a cover sheet use button 142 for using a cover sheet to specify the registration destination of the paper document to be registered and a registration destination specification button 143 for displaying the hierarchical structure of the content data 213A, etc., and specifying the registration destination.

The case where image information is registered in the prospective file object using the cover sheet 13 illustrated in FIG. 5 will be discussed. When the user presses the cover sheet use button 142 on the scan command screen 14B, the web browser 410 displays a message for commanding the user to place the cover sheet and the paper document with them put on each other on the ADF, etc.

Next, the user places the cover sheet and the paper document on the ADF, etc., in accordance with the message and enters read conditions of the document size, the resolution, double-sided scan, etc., in scanning the paper document through the display and operation section 43, thereby entering a scan command.

Next, upon acceptance of the scan command, the control section 40 of the multi function device 4 performs scan processing of reading the cover sheet and the paper document in order in page units through the read section 44.

Next, the control section 40 performs character recognition processing for the read cover sheet and recognizes the ID printed on the cover sheet.

The control section 40 generates image information from the paper document and transmits the generated image information together with the recognized ID to the image processing server 2A. If the paper document is made up of plural pages, the control section 40 generates image information from a plurality of pieces of page image information corresponding to the pages of the paper document.

(3) Determination of Registration Condition and Display of Determination Result

The acceptance section 200 of the image processing server 2A accepts the ID and the image information transmitted from the multi function device 4.

Next, the acquisition section 201A acquires the registration condition corresponding to the ID accepted by the acceptance section 200 from the metadata 214A.

Next, the extraction section 202 performs image processing for the image information accepted by the acceptance section 200 and extracts feature information. The determination section 203A determines whether or not the extracted feature information satisfies the registration condition acquired by the acquisition section 201A.

When the determination section 203A determines that the image information satisfies the registration condition, the registration section 204A acquires registration destination information from the metadata 214A based on the accepted ID and registers the image information in the prospective file object of the registration destination indicated by the registration destination information.

The registration section 204A stores the liked location with the prospective file object as information indicating that image information has been registered in the content field of the corresponding record of the metadata 214A.

On the other hand, when the determination section 203A determines that the image information does not satisfy the registration condition, the determination section 203A transmits the web page information for multi function device 212A indicating the determination result to the multi function device 4, and the web browser 410 of the multi function device 4 displays a determination result screen based on the web page information for multi function device 212A.

Figure 7:
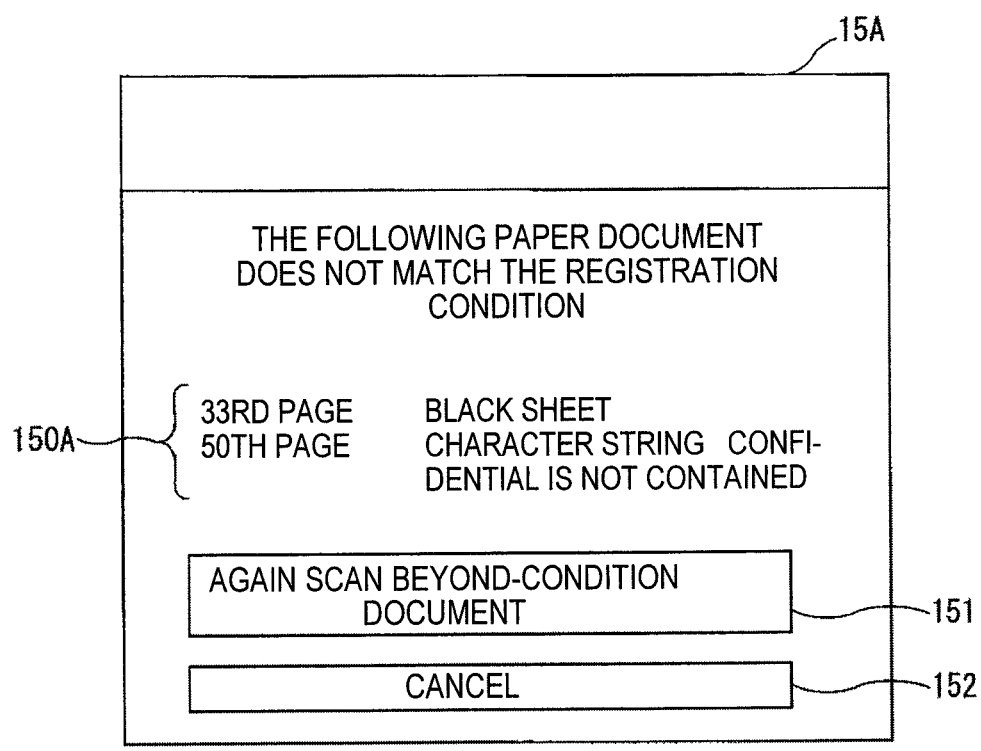
FIG. 7 is a drawing to show an example of a determination result screen.

FIG. 7 is a drawing to show an example of a determination result screen 15A. This determination result screen 15A displays beyond-condition information 150A indicating a beyond-condition page not satisfying the registration condition, a re-scan button 151 for again entering a scan command for the page beyond the registration condition, and a cancel button 152 for entering a command to cancel registration of image information.

If the user visually checks the determination result screen 15A and again enters a scan command for the page beyond the registration condition displayed in the beyond-condition information 150A, the user presses the re-scan button 151 and places the corresponding paper document on the ADF, etc.

Next, the control section 40 of the multi function device 4 reads the paper document placed on the ADF, etc., generates image information, and transmits the generated image information to the image processing server 2A in a similar manner to that described above, and the determination section 203A of the image processing server 2A again determines whether or not the received image information satisfies the registration condition.

If the determination section 203A determines that the again accepted image information satisfies the registration condition, the registration section 204A replaces the corresponding page image information of the previously accepted image information with the page image information contained in the currently accepted image information and registers the resultant image information in the registration destination.

If the control section 40 of the multi function device 4 detects that the cancel button 152 is pressed, the control section 40 notifies the image processing server 2A that the cancel button 152 is pressed, and the registration section 204A of the image processing server 2A cancels the registration processing of the image information.

(Acquisition Example of Registration Condition Considering Read Condition)

Next, an acquisition example of a registration condition corresponding to a read condition when image information is read will be discussed. FIG. 8A is a drawing to show an example of the case where a read condition is given so as to provide a smaller number of pieces of image information than the number of paper documents.

As the read condition, if a command is given so as to collect two paper documents 100A and 100B into one piece of image information 111A, when the registration condition is that the number of pages is 10, for example, the acquisition section 201A acquires the number of pages, five, a half of 10 as the registration condition. When the number of pieces of page image information contained in the read image information is five, the determination section 203A determines that the registration condition is satisfied.

FIG. 8B is a drawing to show an example of the case where a read condition is given so as to provide a larger number of pieces of image information than the number of paper documents.

As the read condition, if a command is given so as to read a double-sided paper document 100C as two pieces of page image information 113a and 113b, when the registration condition is that a blank sheet is not contained, for example, the acquisition section 201A acquires a condition that the page image information 113b corresponding to the back side may be a blank sheet as the registration condition. If the page image information 113b corresponding to the back side, of the page image information contained in the read image information is a blank sheet, the determination section 203A determines that the registration condition is satisfied. The read conditions illustrated in FIGS. 8A and 8B form first and second read conditions.

Figure 9:
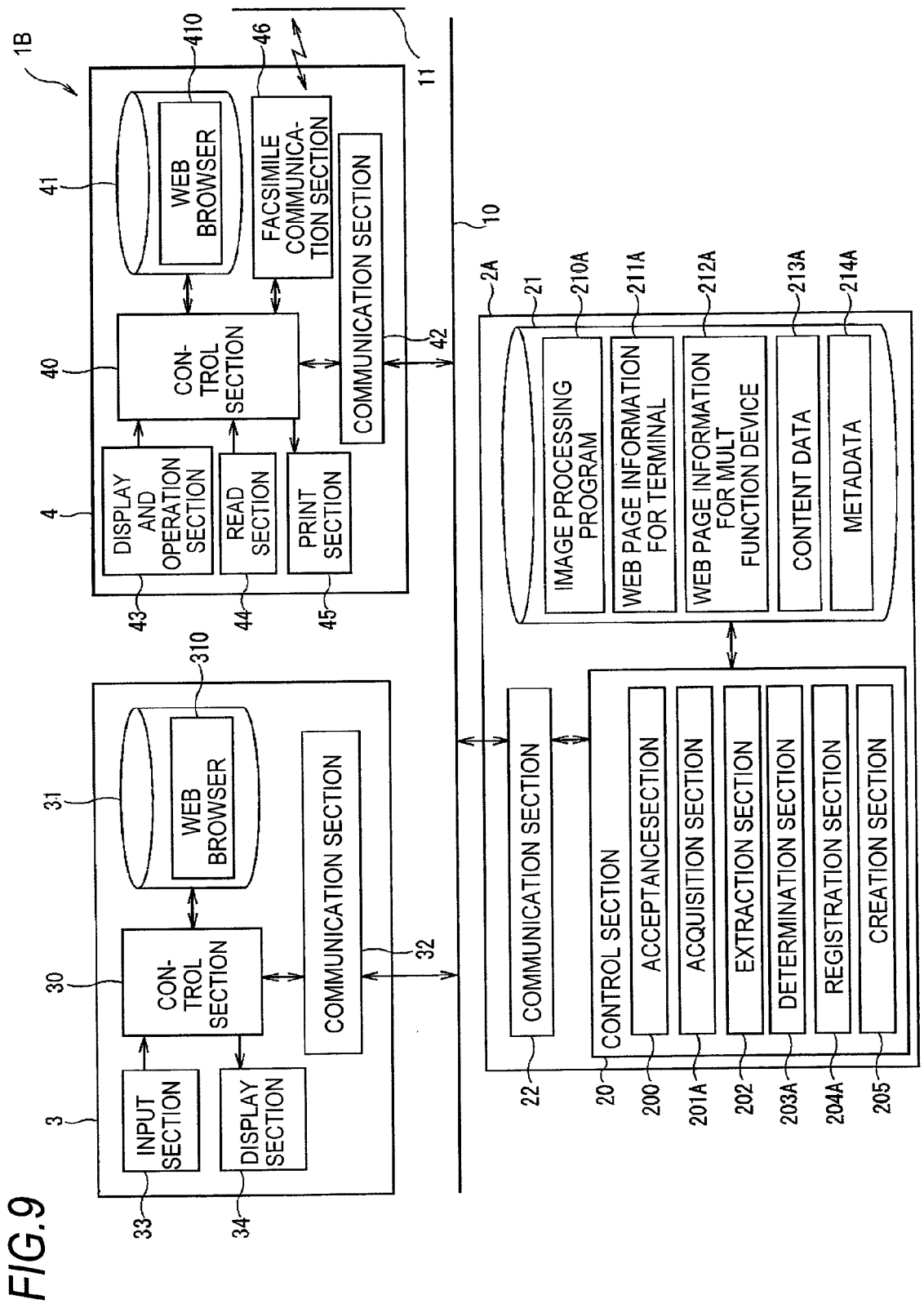
FIG. 9 is a block diagram to show a schematic configuration example of an image processing system according to a second exemplary embodiment of the invention.

FIG. 9 is a block diagram to show a schematic configuration example of an image processing system according to a second exemplary embodiment of the invention. An image processing system 1B is a system for performing version management of image information by giving the version number to image information.

That is, the image processing system 1B includes not only a terminal 3, a multi function device 4, and a network 10 similar to those of the first exemplary embodiment, but also an image processing server 2B for determining whether or not image information is a new version of assumed image information when the image information received from the multi function device 4 is registered.

(Image Processing Server)

Like the image processing server 2A according to the first exemplary embodiment, the image processing server 2B is made up of a control section 20, a storage section 21, and a communication section 22.

The storage section 21 stores an image processing program 210B, web page information for terminal 211B, web page information for multi function device 212B, content data 213B, metadata 214B, and the like.

The web page information for terminal 211B and the web page information for terminal 211B are described in a markup language as in the first exemplary embodiment; the web page information for terminal 211B is screen information for displaying a version addition condition setting screen, etc., described later on the terminal 3 and the web page information for multi function device 212B is screen information for displaying a determination result screen, etc., described later on the multi function device 4.

A plurality of pieces of image information are registered in the content data 213B in a state in which the registration order is managed according to the version number, for example.

FIG. 10 is a drawing to show an example of the metadata 214B. A version addition condition is stored in the metadata 214B as a registration condition determined for each registration destination. Other points of the metadata 214B are similar to the metadata 214A according to the first exemplary embodiment.

The version addition condition may be, for example, whether or not the similarity between the image information to be registered and the image information of the most recent version is equal to or greater than a predetermined value or may be whether or not the similarity between character string information contained in the image information to be registered and character string information contained in the image information of the most recent version is equal to or greater than a predetermined value. Image information used as a template may be provided as image information assumed to be registered and whether or not the similarity between the image information to be registered and the template is equal to or greater than a predetermined value may be determined as the version addition condition.

The character string information similarity is calculated according to the ratio of the number of matched character strings of the character strings acquired by performing character recognition processing for the image information and the image information to be compared to the total number of character strings, for example. As the image information similarity, whether or not the image information and the image information to be compared are similar is calculated according to a pattern matching method.

The control section 20 functions as acquisition section 201B for acquiring the version addition condition corresponding to the registration destination indicated by the registration destination information accepted by acceptance section 200, determination section 203B for determining whether or not the feature information extracted from the image information accepted by the acceptance section 200 satisfies the version addition condition acquired by the acquisition section 201B, registration section 204B for registering the image information in the registration destination as a new version when the determination section 203B determines that the feature information satisfies the version addition condition, and the like in addition to the acceptance section 200, extraction section 202, and creation section 205 similar to those of the first exemplary embodiment as the control section 20 operates in accordance with the image processing program 210B stored in the storage section 21.

(Operation of Second Exemplary Embodiment)

Next, an example of the operation of the image processing system 1B according to the second exemplary embodiment of the invention will be discussed with reference to FIGS. 11 and 12.

(1) Setting of Version Addition Condition

To begin with, the user starts the web browser 310 using the terminal 3 and specifies a predetermined URL, thereby entering a command to display an addition condition setting screen for setting a version addition condition to prospective file object "document 1," for example, through the input section 33 of the terminal 3.

Next, the web browser 310 of the terminal 3 accepts the command and transmits the specified URL to the image processing server 2B. Then, the control section 20 of the image processing server 2B transmits the web page information for terminal 211B corresponding to the specified URL to the terminal 3.

The web browser 310 displays a version addition condition setting screen based on the transmitted web page information for terminal 211B.

Figure 11:
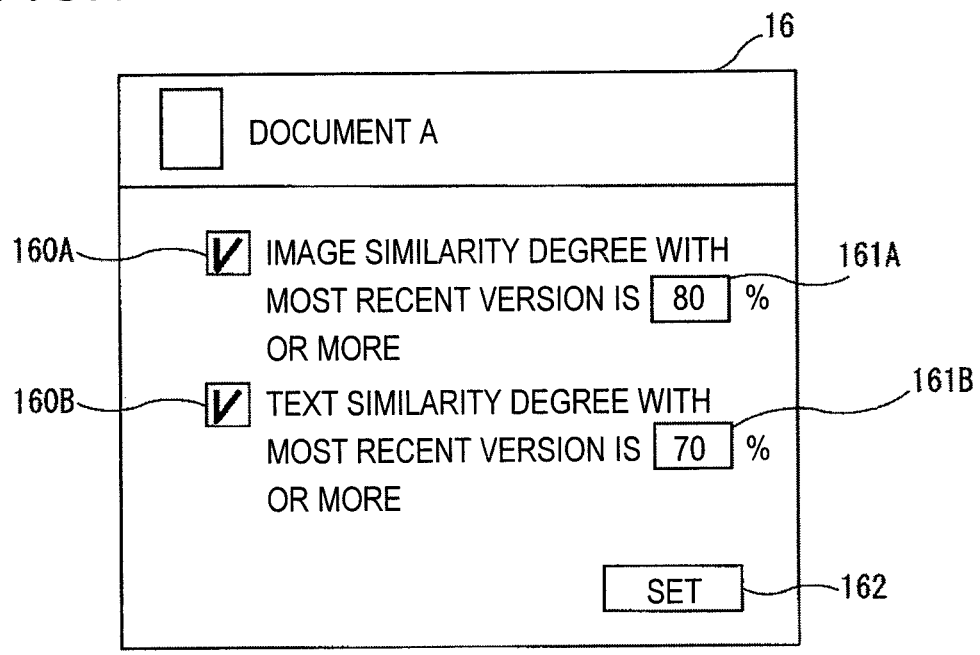
FIG. 11 is a drawing to show an example of a version addition condition setting screen.

FIG. 11 is a drawing to show an example of a version addition condition setting screen. Displayed on a version addition condition setting screen 16 in order from the top to the bottom are a check box 160A for entering a registration command as a new version when the degree of similarity with the image information of the most recent version is equal to or greater than the value entered in a numeric input box 161A, a check box 160B for entering a registration command as a new version when the degree of similarity with the text of the most recent version is equal to or greater than the value entered in a numeric input box 161B, and a set button 162 for setting the entered descriptions as the version addition condition.

Next, when the user enters the version addition condition into the version addition condition setting screen 16 and presses the set button 162, the web browser 310 transmits the entered descriptions to the image processing server 2B.

Next, the control section 20 of the image processing server 2B receives the entered descriptions and stores the version addition condition in the corresponding version addition condition field of the metadata 214B based on the entered descriptions.

(2) Determination of Version Addition Condition and Display of Determination Result When the user places a cover sheet and a paper document on an ADF, etc., and enters a scan command as in the first exemplary embodiment, the control section 40 of the multi function device 4 accepts the scan command and performs scan processing through the read section 44.

The control section 40 transmits image information generated from the paper document together with the ID extracted from the read cover sheet to the image processing server 2B.

The acceptance section 200 of the image processing server 2B accepts the ID and the image information transmitted from the multi function device 4.

Next, the acquisition section 201B acquires the version addition condition corresponding to the ID accepted by the acceptance section 200 from the metadata 214B.

Next, the extraction section 202 extracts feature information from the image information accepted by the acceptance section 200 and the determination section 203B determines whether or not the extracted feature information satisfies the version addition condition acquired by the acquisition section 201B.

When the determination section 203B determines that the image information satisfies the version addition condition, the registration section 204B registers the image information in the registration destination as a new version.

For example, when the image information to be registered is "document 1" and already registered "document 1" exists in folder "X," the image information is compared with the already registered "document 1." When the image information similarity degree is 80% or more and the character string information similarity degree is 70% or more, the determination section 203B determines that the version addition condition is satisfied. The registration section 204B assumes that the image information is image information corresponding to a new version of "document 1," namely, version 2 of "document 1," gives "document 1_V2" to the title of the image information, and registers it in folder "X" of the registration destination.

On the other hand, when the determination section 203B determines that a part of the image information does not satisfy the version addition condition, the determination section 203B transmits the web page information for multi function device 212B indicating the determination result to the multi function device 4, and the web browser 410 displays a determination result screen based on the web page information for multi function device 212B.

Figure 12:
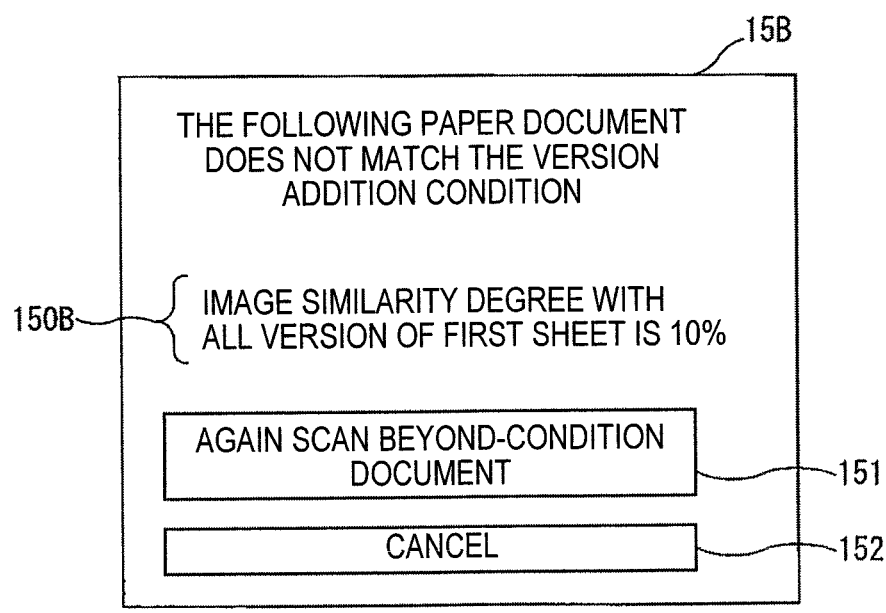
FIG. 12 is a drawing to show an example of a determination result screen.

FIG. 12 is a drawing to show an example of a determination result screen 15B. This determination result screen 15B displays beyond-condition information 150B indicating a beyond-condition page not satisfying the version addition condition and a re-scan button 151 and a cancel button 152 similar to those in FIG. 7.

Next, if the user visually checks the determination result screen 15B and again enters a scan command for the beyond-condition page, the user presses the re-scan button 151 and places the corresponding paper document on the ADF, etc.

The control section 40 of the multi function device 4 reads the paper document, generates image information, and transmits the generated image information to the image processing server 2B, and the determination section 203B of the image processing server 2B again determines whether or not the version addition condition is satisfied. The later operation is similar to that of the first exemplary embodiment and therefore will not be discussed again. If the user presses the cancel button 152, the registration processing of the image information by the determination section 203B is canceled.

[Other Exemplary Embodiments]

It is to be understood that the invention is not limited to the specific exemplary embodiments described above and various changes and modifications can be made without departing from the spirit and the scope of the invention. For example, in the exemplary embodiments described above, the acceptance section, the acquisition section, the determination section, and the registration section of the image processing server are provided by the control section and the image processing program, but some or all of them may be implemented as hardware of an application-specific integrated circuit (ASIC), etc.

The image information to be registered in the exemplary embodiments described above is read from a paper document by the multi function device 4. However, image information received via the telephone line network 11, for example, through the facsimile communication section 46 by the multi function device 4 may be image information to be registered or image information created using an image creation application, etc., in the terminal 3 may be image information to be registered.

The programs used in the exemplary embodiments described above may be read into the storage section from a record medium of a CD-ROM, etc., or may be downloaded into the storage section from a server, etc., connected to a network such as the Internet.

The components of the exemplary embodiments described above may be combined as desired without departing from the spirit and the scope of the invention. For example, the multi function device 4 may store the image processing program in the storage section and the control section of the multi function device 4 may operate as the image processing apparatus in accordance with the image processing program.

The image processing system in each of the exemplary embodiments described above includes one server as the image processing server, but the function, data, etc., that the image processing server has may be included as the whole image processing system and may be distributed to two or more servers. For example, the content data, the metadata, etc., stored in the image processing server may be distributed to two or more servers for storage. For example, the image processing program may be divided into programs and these programs may be stored in two or more servers and the two or more servers may operate in collaboration with each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for managing image information, the process comprising:

receiving a request to store an electronic image of a document;

obtaining a storage location to which the electronic image is to be stored;

acquiring, from a memory that stores metadata associating at least one storage condition with at least one storage location, a storage condition among the at least one storage condition that is associated with the storage location, the storage condition identifying a feature of electronic images allowed to be stored in the storage location;

extracting feature information from the electronic image;

determining whether the extracted feature information of the electronic image satisfies the feature identified by the storage condition; and storing the electronic image in the storage location in response to determining that the extracted feature information satisfies the feature identified by the storage condition and rejecting the request to store the electronic image of the document in response to determining that the extracted feature information does not satisfy the feature identified by the storage condition, wherein the electronic image an electronic image read from a paper document through an image reader, wherein the storage condition includes a read condition when the electronic image is read, wherein the storage condition contains a first read condition of reading so as to provide a smaller number of pieces of image information than a number of paper documents and a second read condition of reading so as to provide a larger number of pieces of image information than the number of paper documents, the number of paper documents is set as the storage condition, when the image information is read by the first read condition, the acquiring step provides the smaller number of pieces of image information than the number of paper documents based on the first read condition, and when the image information is read by the second read condition, the acquiring step provides the larger number of pieces of image information than the number of paper documents based on the second read condition.

2. The non-transitory computer readable medium according to claim 1, wherein the storage condition comprises a degree of similarity between the feature information extracted from the electronic image and the feature of electronic images allowed to be stored in the storage location.

3. The non-transitory computer readable medium according to claim 2, wherein the storing the electronic image comprises storing the electronic image in the storage location in response to determining that a degree of similarity between the feature information extracted from the electronic image and the feature of electronic images allowed to be stored in the storage location is equal to or greater than the degree of similarity of the storage condition.

4. The non-transitory computer readable medium according to claim 1, wherein the storage location indicates a prospective file object in which the electronic image is to be stored.

5. The non-transitory computer readable medium according to claim 1, the process further comprising:

creating indication sheet information to output an indication sheet that indicates the storage location to be read by an image reader.

6. An image processing apparatus comprising:

a controller that controls the image processing apparatus to function as:

an acceptance section that receives a request to store an electronic image of a document and a storage location to which the electronic image is to be stored;

an acquisition section that acquires, from a memory that stores metadata associating at least one storage condition with at least one storage location, a storage condition among the at least one storage condition that is associated with the storage location, the storage condition identifying a feature of electronic images allowed to be stored in the storage location;

an extraction section that extracts feature information from the electronic image; and a registration section that determines whether the extracted feature information of the electronic image satisfies the feature identified by the storage condition, stores the electronic image in the storage location in response to determining that the extracted feature information satisfies the feature identified by the storage condition, and rejects the request to store the electronic image of the document response to determining that the extracted feature information does not satisfy the feature identified by the storage condition, wherein the electronic image is an electronic image read from a paper document through an image reader, wherein the storage condition includes a read condition when the electronic image is read, wherein the storage condition contains a first read condition of reading so as to provide a smaller number of pieces of image information than a number of paper documents and a second read condition of reading so as to provide a larger number of pieces of image information than the number of paper documents, the number of paper documents is set as the storage condition, when the image information is read by the first read condition, the acquisition section provides the smaller number of pieces of image information than the number of paper documents based on the first read condition, and when the image information is read by the second read condition, the acquisition section provides the larger number of pieces of image information than the number of paper documents based on the second read condition.

7. An image processing system comprising:

an acceptance section that receives a request to store an electronic image of a document and a storage location to which the electronic image is to be stored;

an acquisition section that acquires, from a memory that stores metadata associating at least one storage condition with at least one storage location, a storage condition among the at least one storage condition that is associated with the storage location, the storage condition identifying a feature of electronic images allowed to be stored in the storage location;

an extraction section that extracts feature information from the electronic image; and a registration section that determines whether the extracted feature information of the electronic image satisfies the feature identified by the storage condition, stores the electronic image in the storage location in response to determining that the extracted feature information satisfies the feature identified by the storage condition, and rejects the request to store the electronic image of the document in response to determining that the extracted feature information does not satisfy the feature identified by the storage condition; and a storage section in which the registration section stores the electronic image information in the storage location, wherein the electronic image is an electronic image read from a paper document through an image reader, wherein the storage condition includes a read condition when the electronic image is read, wherein the storage condition contains a first read condition of reading so as to provide a smaller number of pieces of image information than a number of paper documents and a second read condition of reading so as to provide a larger umber of pieces of image information than the number of paper documents, the number of paper documents is set as the storage condition, when the image information is read by the first read condition, the acquisition section provides the smaller number of pieces of image information than the number of paper documents based on the first read condition, and when the image information is read by the second read condition, the acquisition section provides the larger number of pieces of image information than the number of paper documents based on the second read condition.

8. The image processing system according to claim 7, further comprising:

a read section that reads the electronic image from a paper document, wherein the acceptance section obtains the electronic image from the read section.

9. An image processing method comprising:

receiving a request to store an electronic image of a document and a storage location to which the electronic image is to be stored;

acquiring, from a memory that stores metadata associating at least one storage condition with at least one storage location, a storage condition among the at least one storage condition that is associated with the storage location, the storage condition identifying a feature of electronic images allowed to be stored in the storage location;

extracting feature information from the electronic image;

determining, by a processor, whether the extracted feature information of the electronic image satisfies the feature identified by the storage condition; and storing the electronic image in the storage location in response to determining that the extracted feature information satisfies the feature identified by the storage condition and rejecting the request to store the electronic image of the document in response to determining that the extracted feature information does not satisfy the feature identified by the storage condition, wherein the electronic image is an electronic image read from a paper document through an image reader, wherein the storage condition includes a read condition when the electronic image is read, wherein the s rage condition contains a first read condition of reading so as to provide a smaller number of pieces of image information than a number of paper documents and a second read condition of reading so as to provide a larger number of pieces of image information than the number of paper documents, the number of paper documents is set as the storage condition when the image information is read by the first read condition, the acquiring step provides the smaller number of pieces of image information than the number of paper documents based on the first read condition, and when the image information is read by the second read condition, the acquiring step provides the larger number of pieces of image information than the number of paper documents based on the second read condition.

\* \* \* \* \*